United States Patent [19]

Borsanyi

[11] Patent Number: 4,854,836
[45] Date of Patent: Aug. 8, 1989

[54] COLLAPSIBLE CONDUIT FOR LINEAR PERISTALTIC PUMP AND METHOD OF MAKING THE SAME

[75] Inventor: Alexander S. Borsanyi, Newport Beach, Calif.

[73] Assignee: Baxter International Inc., Deerfield, Ill.

[21] Appl. No.: 830,693

[22] Filed: Feb. 18, 1986

[51] Int. Cl.⁴ .................... F04B 43/14; F04B 43/12
[52] U.S. Cl. ........................... 417/474; 264/573
[58] Field of Search ............. 417/412, 474–477, 417/43, 478; 604/67, 118, 121, 153; 264/545, 573

[56] References Cited

U.S. PATENT DOCUMENTS

| | | | |
|---|---|---|---|
| 3,046,903 | 7/1962 | Jones | 417/412 X |
| 3,190,229 | 6/1965 | Turowski | 417/507 X |
| 3,542,491 | 11/1970 | Newman | 417/275 |
| 3,901,231 | 8/1975 | Olson | 604/152 |
| 3,949,734 | 4/1976 | Edwards et al. | 417/43 X |
| 3,990,444 | 11/1976 | Vial | 128/214 |
| 4,029,441 | 6/1977 | Fischer | 417/477 |
| 4,373,525 | 2/1983 | Kobayashi | 128/214 |
| 4,410,322 | 10/1983 | Archibald | 417/478 |
| 4,482,347 | 11/1984 | Borsanyi | 604/153 |
| 4,490,135 | 12/1984 | Troutner | 604/67 X |
| 4,499,045 | 2/1985 | Obsomer | 264/573 X |
| 4,557,673 | 12/1985 | Chen et al. | 417/412 |
| 4,563,179 | 1/1986 | Sakai | 604/67 |
| 4,573,968 | 3/1986 | Parker | 604/67 |
| 4,617,014 | 10/1986 | Cannon et al. | 604/67 |

Primary Examiner—Carlton R. Croyle
Assistant Examiner—Eugene L. Szczecina, Jr.
Attorney, Agent, or Firm—Debra E. Dahl; John B. Lungmus

[57] ABSTRACT

A tubular conduit formed of resilient, flexible, thermoplastic material having an intermediate portion with at least one enlarged section that has a flow passage of substantially greater cross-sectional area, and a wall portion of lesser thickness and lower resistance to deformation, than found in the remainder of the conduit. The method of making the collapsible conduit, involving the steps of reshaping a preformed thermoplastic tube by molding it under heat and internal pressure, and the utilization of such a formed conduit in a linear peristaltic pump, are also disclosed.

10 Claims, 2 Drawing Sheets

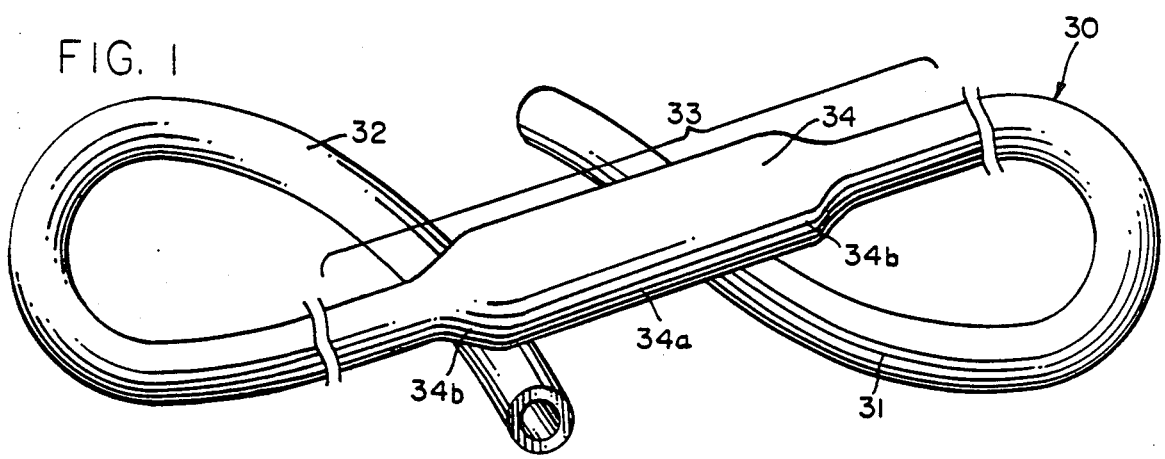
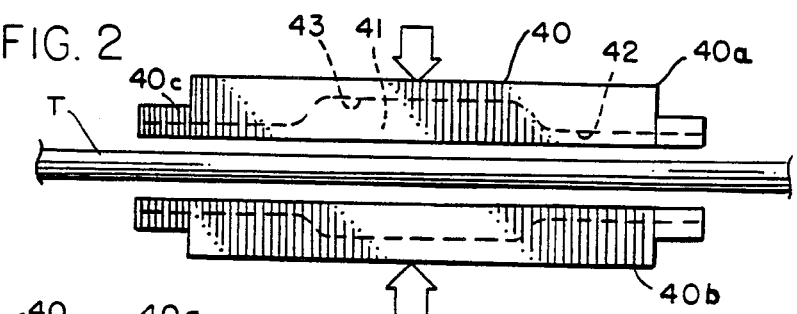
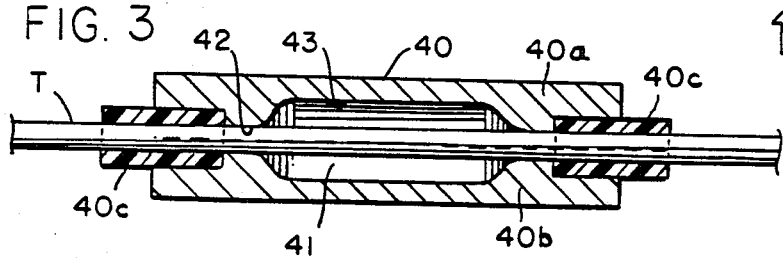
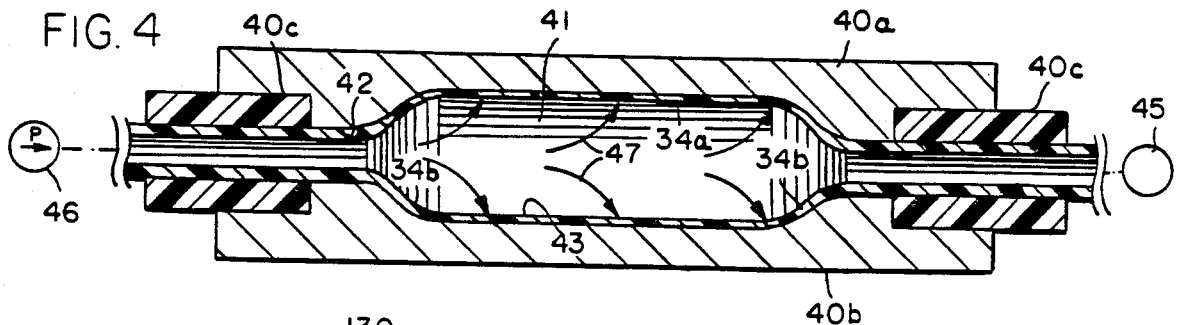
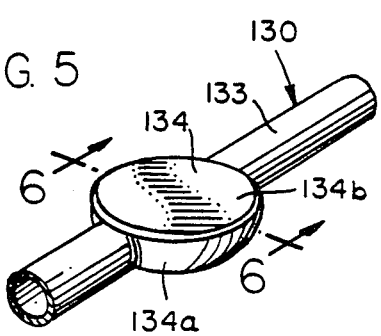
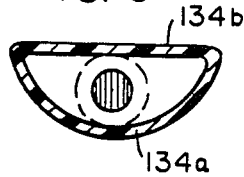
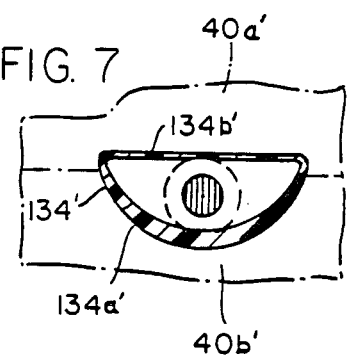

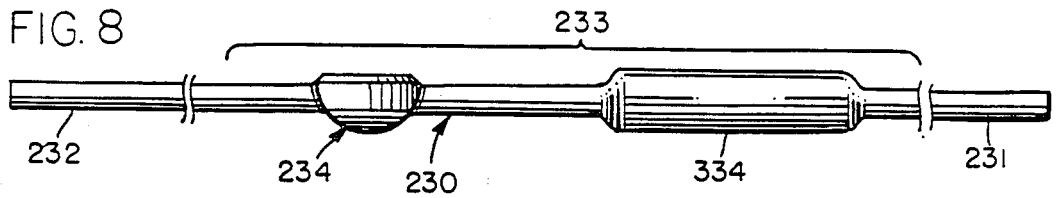
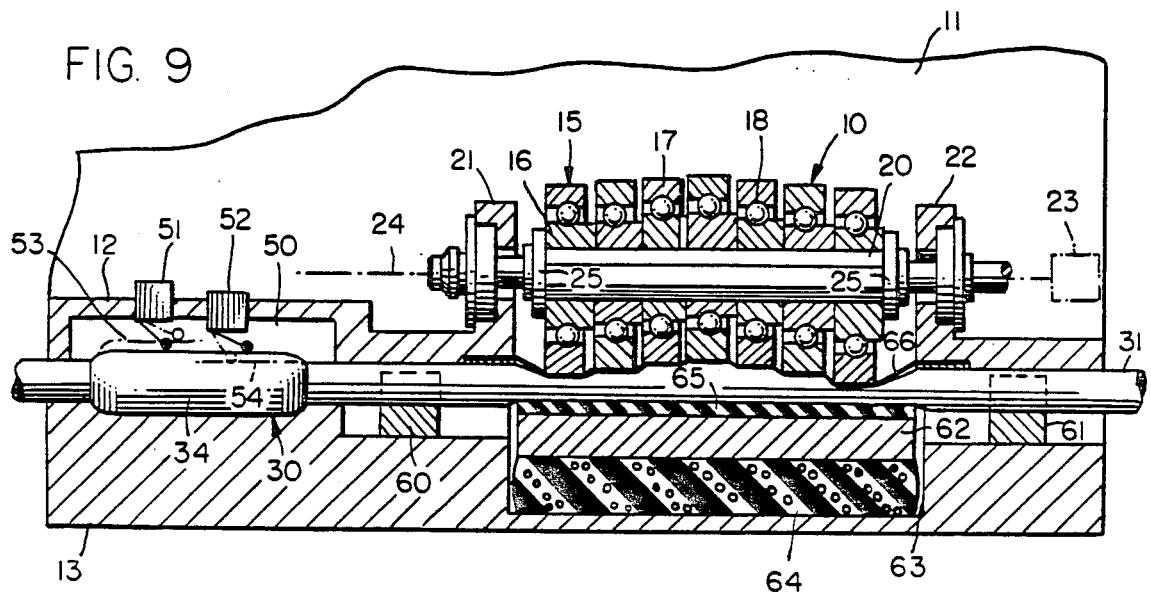
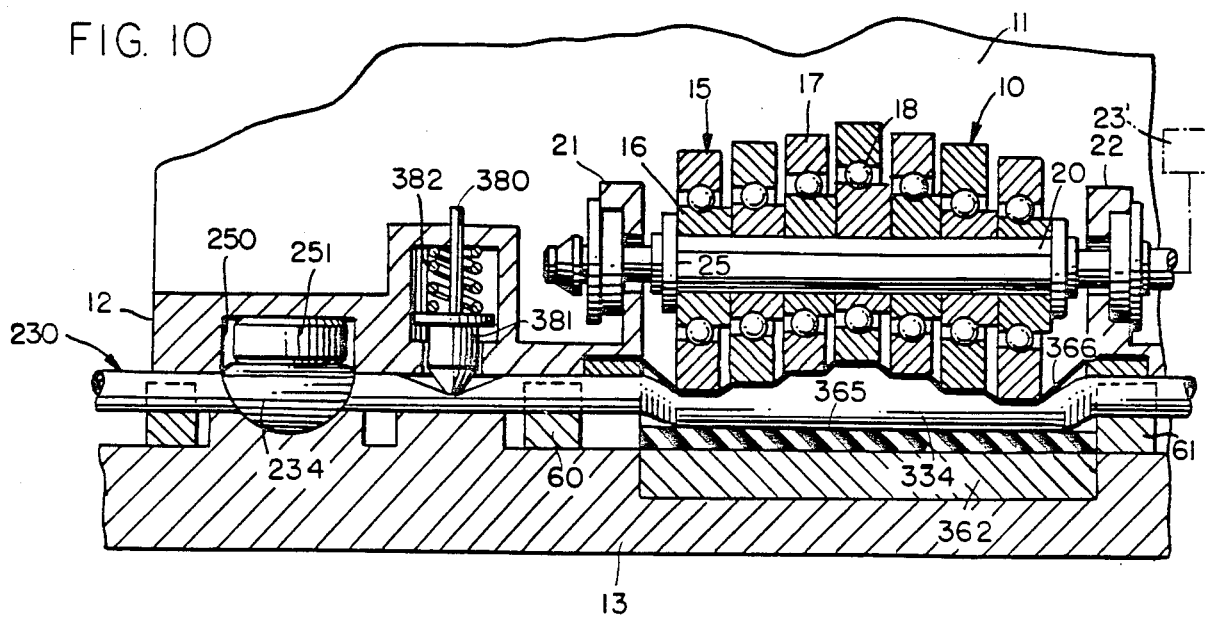

COLLAPSIBLE CONDUIT FOR LINEAR PERISTALTIC PUMP AND METHOD OF MAKING THE SAME

BACKGROUND

Co-owned U.S. Pat. No. 4,482,347 discloses a peristaltic pump which, because of its compactness and simplicity of construction, and its precise, accurate, and reliable operation, is particularly suitable for medical use in a fluid infusion or administration system or in a system for withdrawing fluids, such as wound, urine, pleura, or other drainage systems. The pump includes a series of bearing assemblies each having concentric inner and outer members capable of free rotation with respect to each other. The inner members are concentrically mounted upon a power-driven shaft with the centers of the inner members equidistant from the axis of the shaft and spaced at uniform angular distances thereabout to describe a helix about the axis of the drive shaft. A resilient tube extends along a line parallel with the shaft and is supported by a platen so that the tube is sequentially compressed by each of the outer bearings of the series, thereby driving fluid through the resilient tube. A thin elastomeric membrane is interposed between the outer bearing members and the tube with the membrane in continuous contact with the tube during pump operation.

Other types of peristaltic pumps are disclosed in the references cited in the aforementioned patent and are further represented by U.S. Pat. Nos. 4,373,525, 3,990,444, 3,542,491, and 4,029,441. U.S. Pat. No. 4,373,525 discloses a peristaltic pump with slidable fingers that engage a tube supported by a spring-loaded pressure plate, with the addition of a pivotal arm having "pressing parts" at its opposite ends for depicting pressure changes and triggering a suitable alarm; U.S. Pat. No. 3,990,444 shows a pump having a tube similarly supported by a spring-loaded pressure plate and with multiple rollers carried by a wheel that rotates in the same plane as the tubing; U.S. Pat. No. 3,542,491 discloses a pump also having rollers that are moved along a section of resilient tubing to drive fluid through that tubing; U.S. Pat. No. 4,029,441 discloses tubing formed by a folding operation which is held in place by jaws and saddle elements to insure a desired pumping action by rollers as they are advanced along the tube.

SUMMARY OF THE INVENTION

While the tubing used in conjunction with a linear peristaltic pump as disclosed in co-owned U.S. Pat. No. 4,482,347 may be formed of any suitable resilient plastic material, experience indicates that an elastomeric material such as slicone rubber is especially effective because the ease with which it may be deformed imposes relatively low torque requirements on the pump and because its recovery following deformation insures accurate and uniform pump delivery. The wide availability of tubing formed of non-elastomeric (but resilient) thermoplastic materials, such as the polyvinyl chloride tubing commonly used in parenteral fluid administration sets, irrigation sets, and other delivery and drainage systems used in the medical field, along with the relatively low cost of non-elastomeric tubing, would make such tubing highly desirable for use in linear peristaltic pump applications if it were not for the relatively high forces needed to collapse it, thereby requiring a pump having greater torque output, and the relatively poor recovery of such tubing when deforming forces are removed.

An important aspect of this invention lies in the discovery that thermoplastic tubing formed of polyvinyl chloride or other resilient and flexible, but non-elastomeric material may be highly effective for use in a linear peristaltic pump if the fluid-pumping or pressure-sensing sections of the tube are enlarged to provide increased fluid capacity and reduced wall thickness. By reducing the wall thickness in such critical areas, resistance to deformation is reduced, thereby minimizing torque requirements for a pumping section and increasing sensitivity for a sensing section, and completeness of recovery into an expanded condition is improved. Such completeness of recovery may be further increased, at least in some applications, by providing a flow restrictor at a point downstream from the pumping section. The formed tube may have an enlarged thin-walled pumping section, or an enlarged thin-walled sensing section, or both. Each section may be generally cylindrical or, especially in the case of the sensing section, may be of developed shape to provide greater responsiveness to pressure changes and thereby enhance sensitivity of the pressure sensor with which it is used. In one embodiment, the enlarged pressure-sensing section has a cup-shaped body with an integral planar membrane extending over the cavity of the cup, the planar state of such membrane offering a higher range of displacement for unit of pressure change than other membrane configurations. The wall thickness for each enlarged section need not be uniform throughout that entire section; thus, a section for pressure sensing may be provided in which one wall portion (such as the wall of the cup-shaped body mentioned above) may be of substantially greater thickness than another wall portion (such as the membrane portion).

An additional aspect of this invention lies in providing a simple, inexpensive, and highly effective method for making such a tubular conduit with enlarged thin-wall pumping and/or sensing sections for use in a linear peristaltic pump. The starting material used in the method is resilient thermoplastic tubing of uniform diameter and wall thickness of the type widely available and commonly used in medical applications. A length of such tubing is extended through the cavity of a mold having separable mold sections, the cavity including a pair of spaced, axially-aligned, and generally cylindrical portions each with a diameter substantially the same as the outside diameter of the tubing, and an enlarged intermediate portion having transverse dimensions substantially larger than the outside diameter of such tubing. The mold, or a portion of it, is then heated to soften the thermoplastic material of the tubing within the enlarged intermediate portion of the mold cavity, the tubing is pressurized to cause outward displacement of thermoplastic material in the cavity and to produce an expanded section of tubing with reduced wall thickness, and the mold is then cooled and the tubing thereafter depressurized to permit removal of the tubing with its re-formed thin-wall pumping and/or pressure-sensing sections.

Other features, advantages, and objects of the invention will become apparent from the specification and drawings.

DRAWINGS

FIG. 1 is a fragmentary perspective view of a resilient tubular conduit for use in a linear peristaltic pump.

FIGS. 2 through 4 are schematic views illustrating the sequence of steps in forming the conduit of FIG. 1, with FIG. 4 being of enlarged scale for clarity of illustration.

FIG. 5 is a fragmentary perspective view of a modified tubular conduit with an enlarged thin-wall section particularly suitable for use in pressure sensing.

FIG. 6 is a cross sectional view taken along line 6—6 of FIG. 5.

FIG. 7 is a cross sectional view showing a further modification of the construction of FIG. 6 and further indicating by phantom lines how such a modification may be made.

FIG. 8 is a side elevational view of a further embodiment with two enlarged thin-wall sections, one intended for use in pressure sensing and the other for pumping.

FIG. 9 is a fragmentary and somewhat schematic cross sectional view of a linear peristaltic pump illustrating the conduit of FIG. 1 as it might be used in a peritoneal lavage system.

FIG. 10 illustrates a linear peristaltic pump similar to the one depicted in FIG. 9 but modified for use with the tubular conduit illustrated in FIG. 8.

DETAILED DESCRIPTION OF PREFERRED EMBODIMENTS

FIGS. 9 and 10 illustrate linear peristaltic pumps of the type generally disclosed in U.S. Pat. No. 4,482,347, the disclosure of which is incorporated by reference herein. In both figures the numeral 10 designates a pumping apparatus having a housing 11 composed of a pair of sections 12 and 13 which are locked together in the relationship shown when the pump is operated but which are hingedly or otherwise separably connected to permit insertion and removal of the resilient tubular conduit. Sections 13 and 14 are depicted in both figures as upper and lower sections, respectively, and, while reference may be had to such orientation for clarity of description, it is to be understood that the orientation is not critical and that the pump may be operated effectively in any suitable position.

The pump mechanism includes a series of bearing assemblies 15 each having inner and outer bearing members 16 and 17, respectively. Preferably, the inner bearing member takes the form of an inner bearing race, the outer bearing member constitutes an outer race, and anti-friction bearing elements 18 are disposed therebetween. Such anti-friction bearing elements would normally consist of ball bearings, but the use of various types of roller bearings is possible. Furthermore, other types of bearing assemblies, such as self-lubricating sleeve bearings, might advantageously be used.

Each inner race or member 16 is eccentrically mounted upon a drive shaft 20 and the shaft is in turn journaled in brackets or mounting elements 21 and 22. One end of the shaft is operatively connected to power means in the form of a motor 23 which, depending on the particular application involved, may or may not be of a reversible type.

Each inner race or member 16 is eccentrically mounted upon shaft 20 with the centers of all such races being equidistant from the axis 24 of the drive shaft and with the angular spacing between all of such centers being essentially the same and the sum of the angular spacing being 360°. Where a series of seven bearing assemblies is provided as shown, the incremental angular distance between the centers of the inner races should be 360° divided by 7, or approximately 51.43°. A greater or smaller number of bearing assemblies may be provided, although the preferred range is believed to be 3 to 30 such assemblies. Of particular importance is the fact that the series of bearing assemblies must be mounted upon the drive shaft so that the centers of the inner races describe a spiral or helix of at least 360° about the drive shaft axis.

The inner races are secured against independent relative rotation with respect to shaft 20, and locking elements 25 are secured to the shaft at opposite ends of the series of bearing assemblies 15 to hold the series against axial displacement. As described in detail in U.S. Pat. No. 4,482,347, rotation of the shaft results in sequential compression of the resilient tubing by the bearing assemblies of the series, thereby driving fluid through the lumen of the tubing. However, in the patented construction the tubing is indicated as being of uniform diameter and wall thickness, whereas in the present constructions the tubular conduit has sections of different size and wall thickness.

One such non-uniform conduit construction is depicted in FIG. 1 and a possible application of it is illustrated in FIG. 9. Conduit 30 may be formed of any flexible, resilient, thermoplastic material that has sufficient durability, deformability and recoverability for use in a peristaltic pump. An elastomeric material such as silicone rubber or polyurethane rubber may be used but, for reasons already indicated, the advantages of this invention are particular noteworthy where a non-elastomeric material such as polyvinyl chloride is used. Polyvinyl chloride is selected as an example only because medical grade tubing formed of that material is readily available; it is to be understood that any of a variety of other resilient thermoplastic materials such as polyurethane or styrene-ethylene/butylene-styrene copolymer might instead be used.

Conduit 30 (FIG. 1) is an elongated, one-piece tube having an inlet portion 31, an outlet portion 32, and an intermediate portion 33 disposed between the inlet and outlet portions. The inlet and outlet portions are of generally the same internal and external diameters, but the intermediate portion 33 has an enlarged or bulbous section 34 with a flow passage of greater cross sectional area, and a wall of substantially lesser thickness and reduced resistance to deformation, than found in the inlet or outlet portions.

FIGS. 2–4 illustrate successive steps in the method of making conduit 30. The starting material is thermoplastic tubing T having generally uniform diameter and wall thickness throughout its length. A stretch of tubing T is extended through the cavity of a mold assembly 40 shown in FIG. 1 to be composed of mold sections 40a and 40b. The cavity 41 defined by the tube mold sections includes a pair of spaced, axially-aligned, generally cylindrical portions 42, each with a diameter substantially the same as the outside diameter of the outside diameter of tubing T. The cavity 41 also includes an enlarged portion 43 having transverse dimensions substantially larger than the outside diameter of tube T.

The mold sections 40a and 40b are formed of metal or other suitable heat-conductive material but may include inserts 40c of a phenolic resin or any other suitable thermal insulating material. The inserts are located at opposite ends of the elongated mold assembly to prevent undesirable softening of the plastic material of tube T, especially in areas immediately external to the mold assembly, during a heating and molding operation.

In the heating and molding operation, heat is first applied to one or both of the mold sections to cause a softening of the thermoplastic material of tubing T within the enlarged portion 43 of cavity 41. The selected temperature and the duration of the heating step would depend on the particular thermoplastic material used for tubing T but, in any case, the section of tubing within the cavity must be heated to a temperature at or just below its softening temperature. For polyvinyl chloride, it has been found that a temperature of about 125° C. is effective.

Tubing T is then pressurized, causing that portion of the tubing in the enlarged portion 43 of the cavity to expand outwardly as shown in FIG. 4. Some closure means 45, such as a suitable valve or clamp, is used to close off the lumen of the tubing beyond one end of the assembly mold, and a pump 46 is connected to the other end of tubing T to increase the pressure sufficiently to displace the softened thermoplastic material outwardly as indicated by arrows 47. Pressures of the order of 15 to 25 psig are believed sufficient for most purposes. After the mold is cooled, pressure is released and the conduit with its enlarged thin-wall section 34 is removed from cavity 41.

In the construction illustrated in FIGS. 1–4, the enlarged section 34 has a generally cylindrical body portion 34a and a pair of end portions 34b that merge smoothly with both the enlarged cylindrical portion and the reduced extensions of intermediate portion 33. While the cylindrical body portion 34a is shown to have substantially uniform wall thickness throughout its longitudinal and circumferential extent, some selective variations in wall thickness may be obtained by heating only of the mold sections, or by heating one mold section more than the other, as described in greater detail hereinafter. In any event, the resulting conduit has a bulbous section 34 that, because of its reduced wall thickness and greater diameter, is far more readily compressed or collapsed, and is far more responsive to changes in internal and/or external pressures, than the inlet and outlet portions 31 and 32 of that conduit.

Conduit 30 may be mounted in a linear peristaltic pump as shown in FIG. 9 with its inlet portion 31 upstream of the pump and with its enlarged intermediate portion 34 supported by housing section 13. The enlarged section 34 is disposed in a chamber 50 with a wall portion thereof in contact with suitable pressure sensing means. In the embodiment illustrated, a pair of sensors in the form of limit switches 51 and 52 are provided. Pump motor 23 is reversible and its direction of operation is controlled by the two limit switches. Such an arrangement is particularly useful where a fluid-pumping system is to be used for peritoneal lavage or for any procedure in which fluid is to be introduced to the patient until a predetermined pressure level has been reached and, thereafter, is to be extracted until the pressure has dropped to a minimum predetermined level. Pump 10 is operated by motor 23 to drive fluid through conduit 30 (to the left, as shown in FIG. 9) until the pressure transmitted from the site is sufficient to expand the wall of portion 34 upwardly (outwardly) as indicated by broken line 53, thereby causing switch 51 to close and reverse the direction of motor operation. When enough fluid has been withdrawn from the patient to create a negative back pressure sufficient to cause the wall of enlarged portion 34 to collapse inwardly as indicated by broken line 54, the other switch 52 closes and again reverses the direction of the motor. Suitable valving from a fresh fluid supply source and a drainage fluid reservoir (not shown) would be provided to insure that the two fluids are not intermixed.

The conduit is retained in place by clamps 60 and 61 and by platen 62 supported in recess 63 by compressible means 64 in the form of an elastomeric foam pad. Such a construction, including the trough shape of platen 62 and its resilient facing 65, are disclosed in co-pending application Ser. No. 830,694, filed contemporaneously herewith, and reference may be had to such application for further details of construction and operation of the pump. Preferably, a stretchable film or membrane 66 is interposed between the conduit and the bearing assemblies 15 for the reasons discussed in U.S. Pat. No. 4,482,347.

The enlarged section of the intermediate portion need not be cylindrical but may instead assume other shapes as indicated in FIGS. 5 and 6. There, the enlarged section 134 of intermediate portion 133 has a cup-shaped wall portion 134a and a generally planar membrane portion 134b. Despite the differences in configuration, the enlarged portion 134 is formed in the same manner as described in connection with the forming of enlarged portion 34, following the same steps illustrated and described in connection with FIGS. 2–4. Although the inlet and outlet portions of conduit 130 are not illustrated in FIG. 5, it is to be understood that such portions would bear the same relation to intermediate portion 133 as inlet and outlet portions 31 and 32 bear to intermediate portion 33. A primary advantage of the construction shown in FIGS. 5 and 6, when used in conjunction with a pressure-sensing operation, is that the planar membrane portion 134 deflects a greater extent in response to changes in pressure than if it were non-planar or curved. Therefore, a suitable pressure sensor in contact with the membrane 134b may operate with greater sensitivity than would be possible if the membrane were non-planar. Such sensitivity may be further enhanced by adjusting the temperature of mold sections 40a' and 40b' so that the temperature of section 40a' is greater than that of 40b' during the pressurizing step, producing a membrane 134b' with a wall thickness substantially less than that of body 134a' (FIG. 7).

FIG. 8 depicts a conduit 230 which is formed (or reformed) by the same method described in connection with FIGS. 2–4, such conduit having inlet portion 231, outlet portion 232, and intermediate portion 233. It will be observed that the intermediate portion includes two enlarged sections 234 and 334. Section 234 may be identical to 134 of FIG. 5 (or 134' of FIG. 7), and section 334 may be essentially the same in shape and construction as the cylindrical bulbous section 34 of FIG. 1. Section 334 may, however, have a greater length-to-diameter ratio than section 34 because, as shown in FIG. 10, section 334 functions as a fluid-pumping section when used in conjunction with peristaltic pump 10.

Section 234 for pressure sensing is supported in a pressure sensing chamber 250 with housing section 13 of the pump engaging the cup-shaped body of section 234 and with a pressure transducer 251 in contact with the planar membrane of that section. The transducer, which may be of any conventional type as well known in the art, is in circuit with a relay that controls power to unidirectional motor 23'. When the pressure sensed by transducer 251 reaches a predetermined level, power to the motor 23′ is interrupted. While a transducer is shown and described in connection with this embodiment, it will be understood that other types of pressure sensors, such as a limit switch of the type described in connection with the FIG. 9 embodiment, may be used and, alternatively, one or more pressure transducers may be used in conjunction with the FIG. 9 embodiment.

The pumping section 334 may be supported by a platen assembly of the type shown in FIG. 9 or by one similar to that disclosed in U.S. Pat. No. 4,482,347, the latter being shown in FIG. 10. Platen 362 is rigid and is firmly supported by housing section 13. A resilient facing 365 may be provided to reduce torque peaks and allow greater manufacturing tolerances. A membrane 366 is interposed between the bearing assemblies of the pump and the pumping section 334 of the conduit for the reasons given in U.S. Pat. No. 4,482,347.

An advantage in providing an enlarged pumping section 334 is that it allows the use of a material for the conduit that might otherwise be unsuitable because of excessive resistance to compression, or insufficient rate or extent of recovery, or both. The increased diameter of section 334 combined with its reduced wall thickness allows the use of thermoplastic tubing, particularly non-elastomeric (but resilient) thermoplastic tubing, whose normal wall thickness and diameter would make it unsuitable for such a use. Viewed differently, the provision of an enlarged, elongated, thin-walled pumping section 334 in the conduit of a linear peristaltic pump reduces the torque requirements and improves the operation of such a pump.

Where the conduit 230 is formed from polyvinyl chloride or some other non-elastomeric but flexible thermoplastic material, flow restricting means 380 may be provided between the series of bearing assemblies 15 and pressure sensing means 251. The flow restrictor may take the form of a movable element 381 urged by spring 382 into engagement with that portion of conduit 230 disposed between the pressure sensing section 234 and the pumping section 334 of the conduit. The effect is to create a slight back pressure that promotes faster and more complete recovery of the plastic tubing of the pumping section 334 without adversely affecting operation of sensing section 234. It is believed apparent from the foregoing that while the enlarged pumping section 334 has been shown in a conduit that also includes a pressure-sensing section, the latter section may be omitted if pressure sensing is deemed unnecessary.

While in the foregoing, several embodiments of the invention have been disclosed in considerable detail for purposes of illustration, it will be understood by those skilled in the art that many of these details may be varied without departing from the spirit and scope of the invention.

I claim:

1. A conduit for transmitting fluids, comprising a one-piece, flexible, resilient, non-elastomeric, thermoplastic tube having an inlet portion, an outlet portion, and intermediate portion disposed between said inlet and outlet portions; all of said portions being integral with each other; said inlet and outlet portions having flow passages of the same cross sectional area and walls of the same thickness, respectively; said intermediate portion including an enlarged section having a flow passage of substantially greater cross sectional area, a wall with at least a part thereof having substantially lesser thickness, and a substantially lower resistance to deformation, than those of said inlet and outlet portions; said enlarged section includes a cup-shaped body portion defining a cavity and an integral membrane portion extending over said cavity; said membrane portion having a wall thickness substantially less than that of said body portion; and said membrane portion generally extending along a plane parallel with the longitudinal axis of said conduit when said conduit is in a linear undeformed state.

2. The conduit of claim 1 in which said conduit is formed integrally of polyvinyl chloride.

3. The conduit of claims 1 or 2 in which said inlet and outlet portions are generally cylindrical.

4. The conduit of claim 4 or 1 which said intermediate portion also includes a second enlarged section spaced longitudinally from the first-mentioned enlarged section; said second enlarged section also having a flow passage of substantially greater cross sectional area, a wall with at least a part thereof having substantially lesser wall thickness, and a substantially lower resistance to deformation, than those of said inlet and outlet portions.

5. The conduit of claim 4 in which said second enlarged section is disposed between said first enlarged section and said outlet portion of said conduit.

6. A conduit for transmitting fluids, comprising a one-piece, flexible, resilient, non-elastomeric, thermoplastic tube having an inlet portion, an outlet portion, and an intermediate portion disposed between said inlet and outlet portions; all of said portions being integral with each other; said inlet and outlet portions having flow passages of the same cross sectional area and walls of the same thickness, respectively; said intermediate portion including an enlarged section having a flow passage of substantially greater cross sectional area, a wall with at least a part thereof having a substantially lesser thickness, and a substantially lower resistance to deformation, than those of said inlet and outlet portions; with a peristaltic pump having a series of bearing assemblies each with concentric inner and outer bearing members freely rotatably with respect to each other; said inner members being eccentrically mounted upon a drive shaft with the centers of said inner members being equidistant from the axis of said drive shaft and spaced at uniform angular distances thereabout to describe a helix about said axis; power means for rotating said shaft; support means provided by said pump for clamping said inlet and outlet portions of said tube in longitudinal alignment and for supporting said intermediate portion along a line parallel with said axis for sequential compression by each of said bearing assemblies when said shaft is rotated; said support means supporting said enlarged section at a point between said series of bearing assemblies and said outlet portions of said conduit; and sensing means engageable with said enlarged section for sensing changes in dimension thereof resulting from changes in the pressure of fluid therein;

said pump includes a spring-loaded flow restrictor engageable with the intermediate portion of said conduit between said series of bearing members and said enlarged section for partially constricting said conduit.

7. The conduit of claims 6 in which said enlarged section of said intermediate portion has a generally cylindrical body and a pair of tapered end portions merging smoothly with opposite ends of said cylindrical body; said cylindrical body being concentric with said inlet and outlet portions when said tube is linear and undeformed.

8. The conduit of claim 1 in which said cylindrical body portion of said enlarged section has substantially uniform wall thickness throughout its longitudinal and circumferential extent.

9. The combination of claim 6 in which said power means is reversible; said sensing means being operatively associated with said lower means for reversing direction of rotation of said shaft when selected limits of expansion and contraction of said enlarged section of said conduit are reached.

10. The combination of claim 6 in which said sensing means is operatively associated with said power means for interrupting said power means when pressure of fluid in said enlarged section of said conduit causes said enlarged section to expand beyond a predetermined limit.

* * * * *

UNITED STATES PATENT AND TRADEMARK OFFICE
CERTIFICATE OF CORRECTION

PATENT NO.   : 4,854,836

DATED        : August 8, 1989

INVENTOR(S)  : Alexander S. Borsanyi

It is certified that error appears in the above-identified patent and that said Letters Patent is hereby corrected as shown below:

Col. 5, Line 37, after "only" insert -- one --

Col. 7, line 60, after "and" insert -- an --

Col. 8, line 14, delete "4 or 1" and insert -- 1 or 7 in --

Col. 9, line 3, delete "1" and insert -- 7 --

Col. 9, line 9, delete "lower" and insert -- power --

Signed and Sealed this

Second Day of February, 1993

Attest:

STEPHEN G. KUNIN

*Attesting Officer*          *Acting Commissioner of Patents and Trademarks*